United States Patent [19]

Cohen et al.

[11] 4,204,036

[45] May 20, 1980

[54] MULTIPLE DUTY BATTERY

[75] Inventors: Frederic S. Cohen, Lexington; Albert L. Hyland, Wayland, both of Mass.

[73] Assignee: Polaroid Corporation, Cambridge, Mass.

[21] Appl. No.: 25,087

[22] Filed: Mar. 29, 1979

[51] Int. Cl.² .............................................. H01M 6/46
[52] U.S. Cl. .................... 429/152; 429/158; 429/162; 429/178
[58] Field of Search ................ 429/152, 158, 162, 178

[56] References Cited

U.S. PATENT DOCUMENTS

| 4,007,472 | 2/1977 | Land | 429/153 |
| 4,086,399 | 4/1978 | Hyland et al. | 429/122 |
| 4,086,400 | 4/1978 | Hyland et al. | 429/122 |
| 4,118,860 | 10/1978 | Buckler et al. | 29/623.5 |
| 4,119,770 | 10/1978 | Land | 429/152 |
| 4,125,684 | 11/1978 | Land | 429/122 |

Primary Examiner—Charles F. LeFevour
Attorney, Agent, or Firm—John W. Ericson

[57] ABSTRACT

A laminar battery capable of providing multiple currents and capacities at different voltages, in which electrical access is provided to intermediate cells in the battery by conductive metal terminal layers incorporated in the structure of the battery.

16 Claims, 8 Drawing Figures

MULTIPLE DUTY BATTERY

This invention relates to electrical cells and batteries, and particularly to a novel multiple duty battery of laminar construction.

Many electrically powered devices have requirements for current or voltage sources of different characteristics. Familiar examples are radios, television receivers, computers, electric washing machines and the like. For essentially non-portable apparatus such as washing machines and large computers, it is conventional to provide such current or voltage sources from an AC main source, using transformers or other voltage and current level converters to efficiently supply the varying needs of different portions of the apparatus. For portable devices, however, batteries have been preferred, and the conventional practice has been to provide two or more batteries of different design characteristics to perform each of the several functions required.

A typical modern example of portable battery powered electronic apparatus is the familiar portable hand calculator, which has recently been produced in quite small sizes. While it would frequently be convenient from a design standpoint to have a plurality of voltages and currents available for supplying such apparatus, the desired small size of the finished unit strongly militates against the use of a plurality of conventional batteries for this purpose.

The object of this invention is to simplify the provision of multiple current or voltage sources for an electrically operated device, while simplifying the construction and reducing the size of the required apparatus.

Briefly, the above and other objects of the invention are attained by the construction of a laminar battery having at least three terminals serving as at least two current or voltage sources with the same or different characteristics. Batteries in accordance with the invention may be constructed using a wide variety of electrochemical systems. Such batteries comprise a single multiple duty unit that can be installed in a single step, in a single battery compartment, in contrast to conventional equipment designs in which a separate battery compartment is provided for each different size and shape of battery to be employed in a multiple power source device. A factor which batteries in accordance with a preferred embodiment of the invention have in common is that at least a portion of the battery is usable as a portion of at least two of the current or voltage sources that the battery is capable of providing.

The invention will best be understood in the light of the following detailed description, together with the accompanying drawings, of various illustrative embodiments of the invention.

Figure 1:
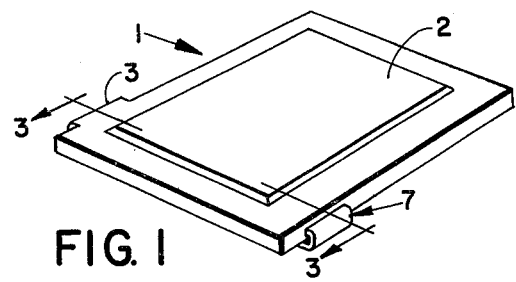
FIG. 1 is a schematic perspective sketch of a multiple duty laminar battery in accordance with the invention.
Figure 2:
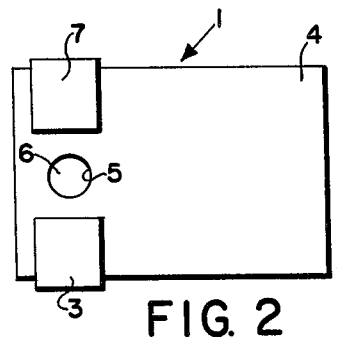
FIG. 2 is a schematic bottom view of the battery of FIG. 1.
Figure 3:
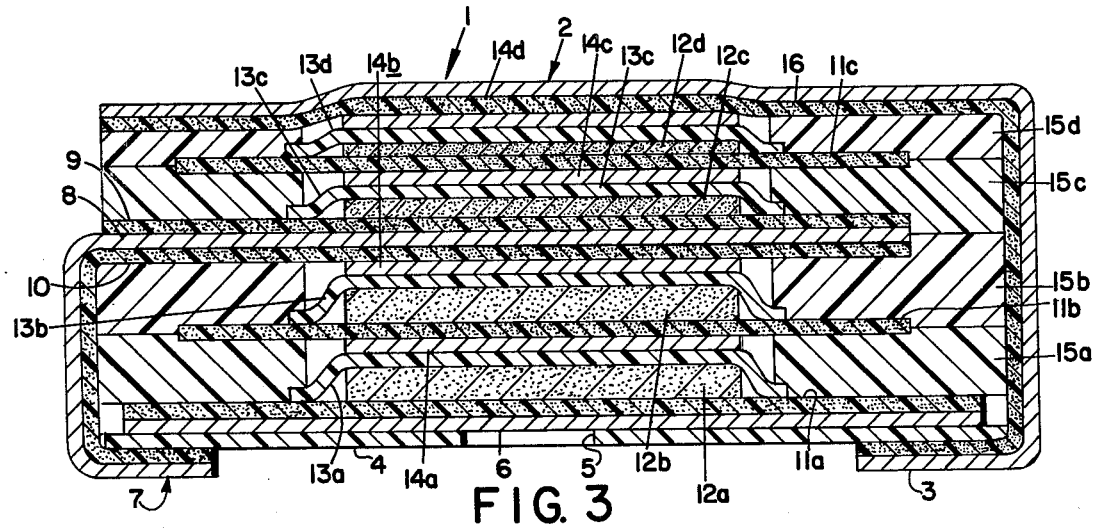
FIG. 3 is a schematic cross sectional elevational sketch, on an enlarged scale, showing internal details of the battery of FIG. 3 as seen essentially along the lines 3—3 in FIG. 1.

Referring to FIGS. 1, 2 and 3, a laminar battery 1 is shown that is formed with an upper metal terminal connector sheet 2, of thin aluminum or the like, formed with a projecting tab 3 which is folded around the battery in a conventional manner, and brought over onto an insulating cardboard sheet 4. The sheet 4 comprises the external layer of the laminar battery on the other side, as seen in FIGS. 2 and 3. So far, the construction described is similar to that described in U.S. Pat. No. 4,086,399, issued on Apr. 25, 1978 to Albert L. Hyland and Robert G. Keane for Laminar Batteries, and assigned to the assignee of this invention.

As indicated in FIGS. 2 and 3, the sheet of cardboard or other insulating material 4 is provided with an aperture 5 to admit an electrical contact to a metal terminal sheet 6 comprising the opposite external conducting terminal of the battery. The metal sheet 6 may, as may the sheet 2, be made of aluminum of, for example, 2 mils in thickness and is preferably adhered to the sheet 4 in any conventional manner.

As indicated in FIGS. 1 through 3, the battery 1 is provided with at least one projecting external terminal tab 7 that is formed integral with a metal current collector sheet 8. As shown in FIG. 3, the metal sheet 8, which may be of 2 mil aluminum, for example, or of wire screen or the like, extends through a central region of the battery and is, within the confines of the battery, surrounded on both sides by layers or coatings of conductive plastic 9 and 10. The metal terminal 8 should be at least coextensive with the electrochemically active regions of the battery. However, as shown, it should be terminated short of the borders of the battery, except for the tab 7, both to conserve materials and to avoid the possibility of a short circuit with the tab 3. As suggested in FIG. 3, the conductive plastic sheet 10 may extend out coextensive with the tab 11 for additional mechanical strength, if so desired.

The conductive plastic sheets 9 and 10 may be of Condulon conductive plastic, as made by Pervel Industries, Inc., or other carbon filled vinyl or other thermoplastic material. The conductive plastic layers 9 and 10 may be laminated to the metal sheet 8 by conventional techniques, or, if desired, may be solution cast or extruded onto the metal sheet. One or more of the intercell terminal sheets 8 may be employed, and these may be at any location between cells in the battery. As shown in FIGS. 1 through 3 by way of example, the terminal 8 is located in the middle of the battery, with two cells above and two cells below.

The two lower cells in FIG. 3 may be of any conventional construction, and for example may be constructed as described in detail in U.S. Pat. No. 4,125,684, issued on Nov. 14, 1978 to Edwin H. Land for Electrical Cells And Batteries and assigned to the assignee of this invention.

Referring to FIG. 3, the terminal sheet 6 of aluminum or the like is adhered to a sheet of conductive plastic 11a, which may be of 2 mils in thickness and applied to the terminal 6 in a conventional manner. On the conductive plastic sheet 11a is deposited a cathode 12a, which may be of any conventional material or construction, and for example may be a cathode slurry of the type described in U.S. Pat. No. 4,119,770, issued on Oct. 10, 1978 to Edwin H. Land for Electrical Cells and Batteries and assigned to the assignee of this invention.

Over and extending beyond the confines of the cathode 12a is a separator 13a which may be of any conventional material, such as kraft paper, any of the various non-woven fibrous sheet materials commonly used in the art, or the like. Preferably, a cellophane separator is employed.

The first cell is completed by an anode layer 14a which may be of slurry form, or may be formed as a dry patch electrode on a conductive plastic intercell connector 11b of conventional construction. A preferred cell construction is described in the above-cited U.S. Pat. No. 4,125,684.

As described in U.S. Pat. No. 4,125,684, the cathode 12a may conveniently comprise a dispersion of carbon and manganese dioxide in a solution of aqueous electrolytes which permeates the separator 13a and wets the anode 14a.

A rectangular frame 15a, of any selected insulating material such as a thermosetting or thermoplastic resin or the like, is adhered to the borders of the conductive plastic current collector 11a. The frame 15a is also adhered to the borders of a conductive plastic intercell connector 11b, and to confronting borders of a next adjacent frame 15b which may be of the same material as the frame 15a. A suitable method of manufacturing batteries with this construction is described in the above-cited U.S. Pat. No. 4,125,684.

A second cell comprises a second cathode 12b deposited on the intercell connector 11b, a separator 13b and an anode 14b. These may be of the same construction as described for the first cell. The third cell in the battery in FIG. 3, above the conductive plastic layer 9, comprises a cathode 12c deposited on the conductive plastic layer 9, a separator 13c, and an anode 14c.

Depending upon the intended use of the battery 1, the cells above the terminal sheet 8 may be of exactly the same construction and dimensions as the cells below the terminal sheet 8. For example, the battery of FIG. 3 is capable of use as two power supplies with the same capacity requirements, such that identical construction of the various cells would be appropriate. However, where the battery is to be used for supplies with different capacity requirements, or where the battery is to be used as a source of low voltage and also as a source of high voltage, the energy requirements of the lower cells will be greater than in the upper cells because the upper cells only serve in the high voltage supply and the lower cells serve in both the high voltage and the low voltage supply. Accordingly, thinner electrodes, in the upper cells, as shown in FIG. 3, would usually be appropriate. Basically, if intended as a portion of a high voltage supply, the upper cells in FIG. 3 should be each designed for the capacity requirements of the high voltage system, and the lower cells should each be designed for the capacity requirements of both the low voltage portion and the high voltage portion, for best efficiency.

The upper cell in FIG. 3 is formed by a cathode 12d deposited on a conductive plastic intercell connector 11b. The upper cell further comprises a separator 13d and an anode layer 14d. The upper cells are surrounded by frames 15c and 15d of the same material as the other frames 15a and 15b.

The battery is terminated on the anode side by a conductive plastic current collector 16 adhered to the upper metal collector sheet 2. As indicated in FIG. 3, the conductive plastic sheet 16 may extend around coextensive with the metal contact terminal tab 3 to the other side of the battery.

If desired, the metal element 8 may serve as one electrode in the battery. For example, if the conductive plastic sheet 10 was omitted, and the element 8 was made of zinc, the anode 14b could be omitted, and the element 8 would perform its function.

Figure 4:
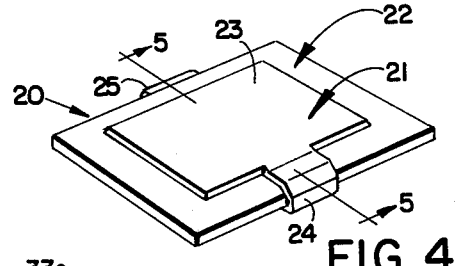
FIG. 4 is a schematic perspective sketch of a battery in accordance with a second embodiment of the invention.
Figure 5:
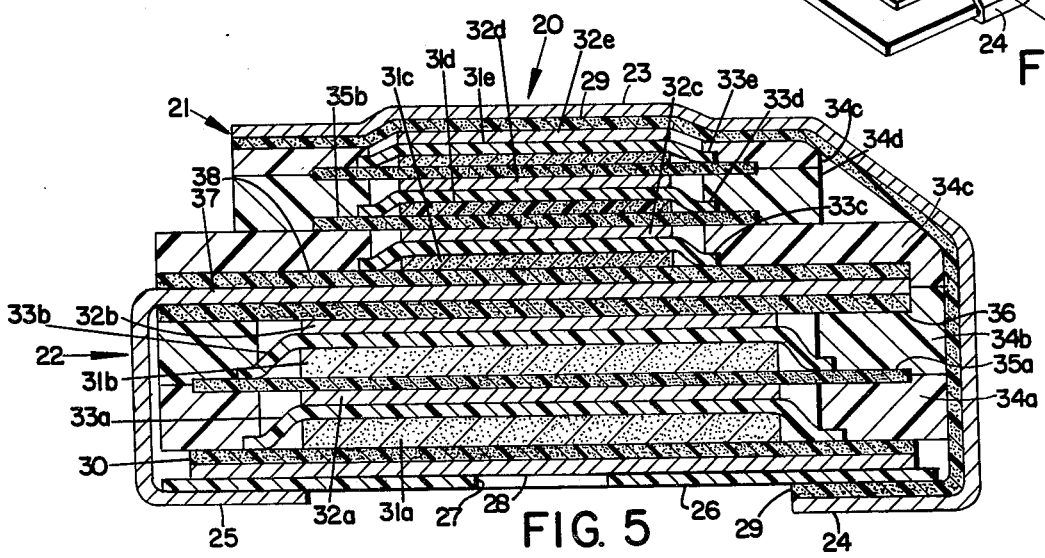
FIG. 5 is a schematic cross sectional elevational sketch, on an enlarged scale, showing the internal construction of the battery of FIG. 4 as seen essentially along the lines 5—5 in FIG. 4.

FIGS. 4 and 5 show a modification of the invention with which widely disparate capacity requirements of a high voltage and low voltage source can readily be matched. As shown in FIGS. 4 and 5, a multiple duty battery 20 comprises a central raised high voltage section 21 and a composite section 22 larger in lateral area than the high voltage section 21.

The top side of the high voltage section 21 comprises a metal terminal sheet 23 of aluminum, tinned steel, or the like, which has a projecting contact tab 24 folded around the battery to present an accessible terminal at the potential of the top cell on the other side of the battery. A similar metal terminal tab 25 extends out from the side of the lower battery section 22 and is carried down to the bottom of the battery as shown in FIG. 5.

The battery 20 in FIGS. 4 and 5 may be made essentially in the same manner as the battery described above in connection with FIGS. 1-3, except for differences in the proportions of certain of the components as will be described below. As shown in FIG. 5, the battery is provided with a base sheet 26 of a suitable insulating material such as cardboard or the like, and preferably of the construction and materials described in U.S. Pat. No. 4,086,400, issued on Apr. 25, 1978 to Albert L. Hyland and Victor Michnick for Carrier Web For Laminar Batteries and assigned to the assignee of this invention. The insulating sheet 26 is provided with an aperture 27 for access to the lower terminal sheet 28, of aluminum, tinned steel, or the like. As indicated, the metal terminal sheet 23 is laminated to a sheet 29 of conductive plastic. As in the version shown in FIG. 5, the sheet 29 is carried around with the terminal sheet 23 and its extension 24 to the other side of the battery.

The low voltage section of the battery 20 comprises two cells built up on the insulating carrier sheet 26. The positive terminal of the battery is formed by the metal terminal sheet 28, to which is adhered a conventional conductive plastic current collector 30. The two lower cells comprise cathodes 31a and 31b, anodes 32a and 32b, separators 33a and 33b, frames 34a and 34b, and a conductive plastic intercell connector 35a, all of which may be made and assembled as described above.

The upper anode 32b of the second cell is adhered to a conductive plastic current collector 36 that is in turn laminated to a central metal current collector sheet 37 formed integral with the extending tab 25 that extends down to the bottom of the battery. The sheet 37 may be, for example, of aluminum 2 mils in thickness.

On the opposite side of the sheet 37 is laminated a conductive plastic current collector 38 that serves to isolate the metal terminal 37 chemically from the upper cells. On the conductive plastic current collector 38 is deposited the first cathode 31c of the first of three cells of the high voltage section 21.

The cathode 31c is shown both smaller in lateral area and thinner than corresponding cathodes 31a and 31b in the low voltage section. This arrangement reflects the fact that the capacity of each cell in the low voltage section 22 must be adequate for the low voltage supply and the appropriate share of the high voltage supply. Thus, cathodes such as 31b would require enough active material for the expected capacity requirements of the low voltage section, as well as an amount of active material equal to the amount in the cathodes such as 31c of the high voltage section. One advantage of this arrangement is that when the capacity requirements of the high voltage section cells are so small that they would become impracticably thin in a construction such as that shown in FIG. 3, they may be made of a desired thickness by reducing the area in the manner indicated.

The cells of the high voltage section are made in essentially the same manner as the larger cells of the lower section 22, except for the differences in the size of the components. As shown, the cathodes 31c, 31d, and 31e of the upper section are each of equal thickness and area, and the anodes 32c, 32d and 32e are of corresponding electrochemically equivalent size and thickness depending on the same considerations just discussed for the cathodes. The separators 33c, 33d, and 33e may be of the same material as the separators 33a and 33b of the section 22, except that they may be correspondingly smaller in area.

The first frame 34c for the upper section is preferably made coextensive with the conductive plastic current collector 37 to avoid an exposed area at the potential of the terminal sheet 37. However, the remaining frames 34b and 34e, and any additional frames for additional cells that may be desired, may advantageously be made smaller in area than the frames of the lower section as shown.

As shown in the drawing, the central apertures in the frames 34d and 34e are correspondingly smaller than the similar apertures in the frames 34a and 34b.

As is conventional in the construction of batteries of the kind here shown and described, the frames 34a through 34e are sealed under heat and pressure to the confronting faces of the conductive plastic elements 34a through 34c, 36, 38 and 39, as by the application of heat and pressure. The borders of the separators 33a through 33e may be within the confines of the area of the seal, or may enter into and participate in the seal if desired.

Figure 6:
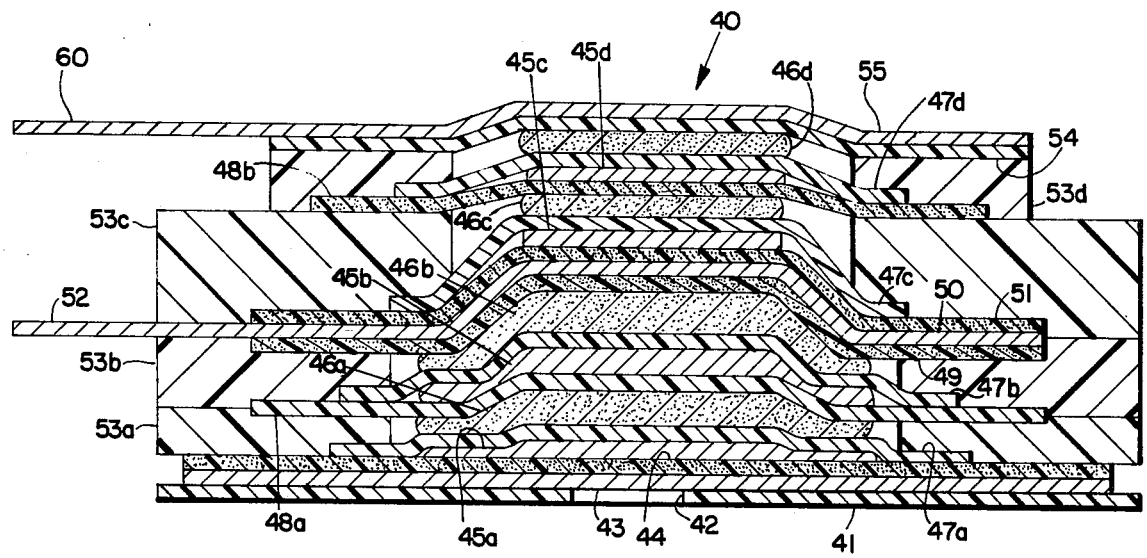
FIG. 6 is a cross sectional view similar to that of FIG. 5, showing another modification of the invention.

FIG. 6 shows a double duty battery, comprising four cells generally of the type described in connection with FIGS. 1 through 5, employing another method of constructing the common section in which additional electrode material is deposited in the central regions of the cells common to both sections of the battery.

As in the case of the modifications described above, the battery 40 is built up on a carrier sheet 41 of insulating material provided with an aperture 42 to permit access by an electrical contact to the cathode metal terminal sheet 43. The terminal sheet 43 may be adhered to the carrier sheet 41 in any conventional manner. A conductive plastic current collector 44 is adhered to the metal sheet 43.

The battery 40 comprises four cells built up in the same manner as described above and comprising anodes 45a, 45b, 45c, and 45d, cathodes 46a, 46b, 46c and 46d, separators 47a, 47b, 47c and 47d, intercell connectors 48a and 48b, and an intermediate intercell and terminal assembly comprising a conductive plastic current collector 49 laminated to a metal terminal collector sheet 50 of aluminum or the like, and a conductive plastic current collector 51 laminated to the metal sheet 50.

The sheet 50 terminates in a protruding end portion 52 that may be folded around the top or the bottom of the battery in the manner described above, or simply allowed to extend out as shown for electrical connection to desired load circuitry. Thermoplastic frames 53a, 53b, 53c, and 53d are provided of the nature and for the purposes described above. The cathode terminal of the battery is completed by a conductive plastic current collector 54 sealed to the frame 53d and laminated to a metal terminal sheet 55 of aluminum or the like, which has a protruding terminal portion 60 that may be folded around the battery or connected to external circuits in any desired manner.

One difference between the battery 40 and others described above is that the anodes such as 45a are at the bottom so that the terminal 43 is the anode terminal, and would be negative with respect to the cathode terminal 60. This is a matter of choice or design, as either order of assembly of the components can be made. A second difference in the structure of the battery 40 is that the conductive plastic portions of the intercell terminal assembly, comprising two conductive plastic layers 49 and 51 and an intermediate metal terminal sheet 50, do not extend to the edges of the battery even at the extension 52 of the terminal sheet 50, but are terminated substantially coextensively with the intercell connector 48a. This arrangement avoids the waste of two strips of conductive plastic when the terminal assembly is made by laminating sheet material.

A principal feature of the battery 40 is that the anodes 45a and 45b in the lower section of the battery, as well as the cathodes 46a and 46b in the corresponding cells, have more active material in the central regions than in the bordering portions. These cathodes and anodes, if of slurry form, can be best extruded or otherwise deposited in place in two passes, with the first layer being the thinner layer that covers the entire anode or cathode area, and the central portion being added over a smaller area.

Slurry anodes and cathodes suitable for use in this construction are described, for example, in U.S. Pat. No. 4,118,860, issued on Oct. 10, 1978 to Sheldon A. Buckler, Frederic S. Cohen, and David P. Kennedy for Method Of Making A Flat Battery and assigned to the assignee of this invention.

Alternatively, a construction especially adapted for the cathodes in a battery of the kind shown in FIG. 6 is the use of a hybrid cathode comprising a dry patch cathode and covered with a slurry cathode in the central regions. Such hybrid cathodes are described in more detail in U.S. Pat. No. 4,007,472, issued on Feb. 8, 1977 to Edwin H. Land for Flat Battery With Dry Cathode Strata And Slurry Cathode Strata, and assigned to the assignee of this invention. In the use of such a construction, a hybrid cathode comprising a dry patch electrode deposited over the full electrode region of the lower two cells could be employed, and the cathode slurry layer deposited over the central region. Alternatively, a dry patch cathode could first be formed, and covered with a larger area of cathode slurry. If the high voltage portion of the battery was intended for use with high current drain and the low voltage portion for low current drain, such a dry patch electrode construction would advantageously use a higher ratio of manganese dioxide to carbon than in the slurry portion of the cathode, as a better choice for low current drain applications. Specifically, a 25 to 1 weight ratio of manganese dioxide to carbon could be used in the dry patch layers, and an 8 to 1 weight ratio of manganese dioxide to carbon in the slurry portion of the cathodes. With this construction, the cathodes 46c and 46d in the upper portion of the battery could advantageously be made of the same slurry composition as that used in the hybrid cathodes of the lower section. Alternatively, if the current drain requirements on the high voltage section were more moderate, dry patch cathodes could advantageously be used in the upper section.

The construction of FIG. 6 may be used to advantage where the anodes or cathodes, or both, in the upper section would be impractically thin if anode coextensive with the electrodes in the lower section, or where a battery thinner at the edge than in the central region is desired.

Three terminal batteries of the kind described with respect to FIGS. 1 through 6 above may be used in several ways as dual source batteries depending on which terminal is taken as the common terminal. By choosing either of the extreme terminals as the common terminal, either two positive voltages or two negative voltages may be obtained. By choosing an intermediate terminal such as 52 in FIG. 6 as the common terminal, either two positive voltages or two negative voltages may be obtained. By choosing an intermediate terminal such as 52 in FIG. 6 as the common terminal, a positive and a negative voltage which may be of the same or different values may be obtained, and either the same or different battery capacities may be provided. Where the center terminal is chosen as the common terminal, the two sources operate independently and there is no common section, so that conventional design considerations may be employed in selecting the weights of components to be utilized.

Figure 7:
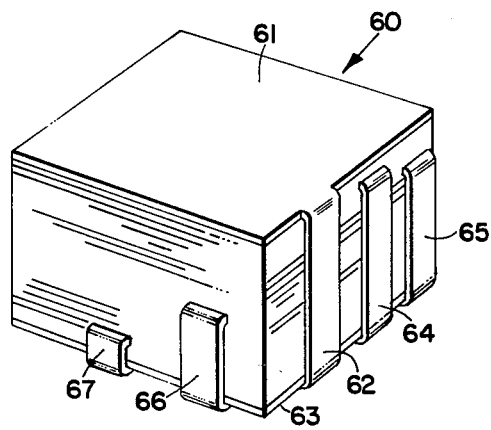
FIG. 7 is a schematic perspective sketch of a multiple duty laminar battery in accordance with still another embodiment of the invention.
Figure 8:
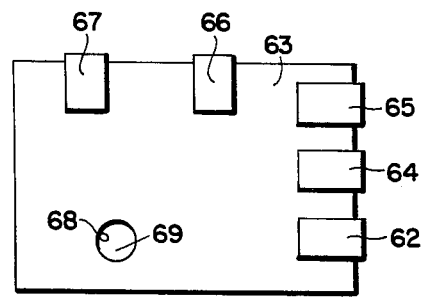
FIG. 8 is a schematic bottom plan view of the battery of FIG. 7.

FIGS. 7 and 8 illustrate a battery 60 in accordance with the invention which is provided with more than one intermediate terminal. In particular, the top metal terminal 61 of the battery 60 has an extending tab portion 62 which is folded down around the battery over a insulating layer 63 at the bottom. Four intermediate terminals, 64, 65, 66 and 67 are similarly folded over the battery over the insulating sheet 63. The sheet 63 is provided with an aperture 68 to expose the bottom metal terminal 69 of the battery.

The battery 60 may be constructed in the manner described above in connection with any of the embodiments of FIGS. 1 through 6. With a battery constructed as shown in FIG. 7, any of six sets of positive and negative voltages may be obtained depending on the choice of one of the terminals as the common terminal.

While the invention has been described with reference to specific details of various illustrative embodiments thereof, many changes and variations will occur to those skilled in the art upon reading this description, and such can obviously be made without departing from the scope of the invention.

Having thus described the invention, what is claimed is:

1. A laminar multiple duty battery, comprising a stack of series connected cells extending between a first outer terminal and a second outer terminal and comprising at least one intercell terminal assembly connecting a pair of adjacent cells in said stack, each intercell terminal assembly comprising a conductive metal element formed with a tab projecting from the battery for connection to external circuitry, each said metal element being covered on both sides at least in the region within the battery by conductive plastic current collectors extending over at least the active cell regions of the contiguous cells.

2. The battery of claim 1, further comprising a laminar insulating member adhered to one of said outer terminals, and the other of said outer terminals being formed with an extension, each said extension formed on each said conductive element and said outer terminal extension being folded around said battery over different regions of said insulating member.

3. A laminar multiple duty battery, comprising a stack of at least two series connected cells extending between a first outer terminal and a second outer terminal and comprising an intercell terminal assembly connecting a pair of adjacent cells in said stack, said intercell terminal assembly comprising a conductive metal element formed with an extension projecting from the battery for connection to external circuitry, said metal element being covered on both sides at least in the region within the battery by conductive plastic current collectors extending over at least the active cell regions of the contiguous cells.

4. The battery of claim 3, in which said cells each comprise a laminar anode and a laminar cathode, the anodes in said cells all being of the same area and the cathodes in said cells all being of the same area.

5. The battery of claim 4, in which, in each cell between said first outer terminal and said conductive metal element, the anode and the cathode are of different thickness than the anode and the cathode, respectively, in each cell between said conductive element and said second outer terminal.

6. The battery of claim 4, in which the anodes in said cells are all of the same thickness and the cathodes in said cells are all of the same thickness.

7. The battery of claim 3, in which said cells each comprise a laminar anode and a laminar cathode, and in which the anode and the cathode in each cell between said first outer terminal and said conductive metal element have lateral areas different from the lateral areas of the anode and the cathode in each cell between said conductive metal element and said second outer terminal.

8. The battery of claim 7, in which the anodes and the cathodes in each cell between said first outer terminal and said conductive element are of smaller thickness and lateral area than the anode and the cathode, respectively, in each cell between said conductive metal element and said outer terminal.

9. The battery of claim 3, in which each cell between said first outer terminal and said conductive element comprises a cathode having a first lateral area and a first thickness, and in which each cell between said conductive element and said second outer terminal comprises a cathode comprising a first cathode stratum of said first thickness and said first lateral area on a second cathode stratum of a second area larger than said first area.

10. The battery of claim 9, in which each first cathode stratum, and each cathode between said first outer terminal and said conductive element, are of a first composition, and in which each second cathode stratum is of a second composition, said first composition being chosen for a first current drain rate and said second composition being chosen for a second current drain rate.

11. A laminar multiple duty battery, comprising a stack of at least three series connected cells extending between a first outer metal terminal sheet and a second outer metal terminal sheet, at least two intercell terminal assemblies each connecting a different adjacent pair of cells in said stack, each intercell terminal assembly comprising a laminar metal conducting element formed with an extension projecting from the battery for connection to external circuitry, each of said conducting elements being covered on both sides at least in the region within the battery by conductive plastic over at least the active cell regions of the contiguous cells.

12. The battery of claim 11, in which said cells comprise laminar anodes and laminar cathodes, and in which all of said cathodes are of the same area, and in which all of said anodes are of the same area.

13. The battery of claim 12, in which all of said cathodes are of the same thickness.

14. The battery of claim 12, in which all of said anodes are of the same thickness.

15. The battery of claim 12, in which the cathode in the cell contiguous with one side of a first of said intercell terminal assemblies is of different thickness from the cathode in the cell contiguous with the other side of said first intercell connector.

16. The battery of claim 11, in which said cells comprise laminar anodes and laminar cathodes, and in which the anode and cathode of a cell contiguous with a first side of a first of said intercell terminal assemblies have a first lateral anode area and a first lateral cathode area, and in which the anode and cathode in the cell contiguous with the other side of said first intercell terminal assembly have second lateral anode and cathode areas larger than said first anode and cathode areas, respectively.

* * * * *